United States Patent [19]

Biron

[11] 4,061,573
[45] Dec. 6, 1977

[54] PORTABLE OIL-WATER SEPARATION APPARATUS

[75] Inventor: Richard D. Biron, Acton, Mass.

[73] Assignee: Seagull Industries, Inc., Acton, Mass.

[21] Appl. No.: 614,818

[22] Filed: Sept. 18, 1975

[51] Int. Cl.$^2$ .............................................. B01D 27/02
[52] U.S. Cl. ................................. 210/282; 210/288; 210/DIG. 26
[58] Field of Search .............. 210/23 R, 40, 282, 288, 210/443, 502, DIG. 5, DIG. 26

[56] References Cited

U.S. PATENT DOCUMENTS

| 3,598,729 | 8/1971 | Baumann | 210/40 |
| 3,657,125 | 4/1972 | Strickman | 210/DIG. 26 |
| 3,836,000 | 9/1974 | Jakubek | 210/DIG. 26 |

Primary Examiner—Thomas G. Wyse
Assistant Examiner—Ivars Cintins
Attorney, Agent, or Firm—David E. Brook

[57] ABSTRACT

A portable oil-water separation unit especially well adapted for use in removing oil from limited quantities of water such as in clarifying bilge water in a boat, includes a sealed container containing a flexible, porous bag filled or packed with a granular oleophilic, hydrophobic foamed polymeric material. The container has a removable closure, with an inlet and at least one outlet extending through the closure to permit a water-oil mixture such as bilge water to be circulated therethrough. The inlet conduit terminates in the top portion of the container at a point spaced below the closure while the outlet conduit extends to and terminates at a position adjacent the bottom of the container so that the effluent from the apparatus must flow downward through the foamed material, whereby the oil is separated by attraction to the oleophilic material as well as by filtration and floatation while the water is permitted to flow through the device.

5 Claims, 3 Drawing Figures

PORTABLE OIL-WATER SEPARATION APPARATUS

BACKGROUND OF THE INVENTION

1. Field of the Invention

This invention relates to water clarification apparatus, and more particularly to an improved portable apparatus for separating oil from a mixture of oil and water.

2. Description of the Prior Art

Numerous devices have been developed in the past for separating oil from water, with these prior art devices using various known techniques including floatation and/or sedimentation tanks, inclined flow separators, filtration devices, centrifugal separators, and combinations of these and other known devices, including the use of various oleophilic and hydrophilic materials in various forms to separate the water and oil. However, these prior art devices have generally not been easily portable and consequently have not been readily available for use in remote places such as in boats, especially small pleasure boats, and generally have not been economical for use in many instances.

Regulations recently promulgated by the U.S. Coast Guard, pursuant to Title 33, U.S. Code, prohibit the discharge of oil and oily waste into or upon the navigable waters and contiguous areas of the United States if such discharge contains sufficient oil to cause a film or sheen upon or discoloration of the surface of the water, or to produce a sludge or emulsion beneath the surface. Compliance with these strict regulations has presented a serious problem for many small businesses as well as for boat operators. For example, it has generally been necessary for boats to pump oily bilge water only when at dockside where holding tank facilities are available. Furthermore, the servicing of holding tanks and the like has presented a serious problem for many marinas and dock facilities, frequently requiring the oil-contaminated water to be transported to a fixed installation having facilities for removing the oil before disposing of the clarified water by discharging it into an existing sewer, stream, or the like.

SUMMARY OF THE INVENTION

It is the primary object of the present invention to provide an inexpensive, yet efficient, portable apparatus for removing oil from an oil-water mixture. This and other objects are accomplished in an apparatus according to the present invention which employs an open-ended container of appropriate size, depending upon the anticipated use, with a removable closure for sealing the container to form a portable separation chamber. A porous, flexible bag, preferably formed from a cotton or other hydrophilic material, is filled with sufficient granular or ground foamed oleophilic, hydrophobic, polymeric material to substantially fill the separation chamber and placed in the open container and the container filled to the top with clear water.

A pair of openings in the container closure are fitted, one with an inlet conduit and the other with an outlet conduit. The inlet and outlet conduits extend through the closure a disstance such that, when the closure is mounted on the container, the inlet conduit terminates in the upper portion of the separation chamber at a point spaced below the closure surface, and the outlet conduit extends to a position adjacent the bottom of the chamber. Preferably, the outlet conduit is arranged adjacent the side edge of the closure whereby the outlet conduit can be passed along the container wall after the bag of foam material is placed in the container. The inlet conduit is adapted to be connected to a suitable source of oil-water mixture, under pressure, which is discharged into the top of the separation chamber. Preferably means are provided for restricting the rate of flow into the container to avoid flusing oil through the separation medium and out the outlet conduit.

While various foamed oleophilic, polymeric materials may be used in the apparatus according to the present invention, it has been found that excellent results are obtained by use of a urethane foam with an isocyanate base, which is commercially available from several manufacturers. This urethane foam is not affected dimensionally by oils and is not wet by water. The foam is ground to an aggregate size such that at least a major portion of the particles are within the range of one-quarter to one-half inch. Such material is capable of attracting and absorbing twenty to thirty times its basic weight, with more dense foam generally being capable of absorbing less oil and the lighter foam absorbing more oil. This material is capable of absorbing, in the apparatus according to the present invention, up to about thirty pounds of oil per cubic foot of foam material.

In operation of the apparatus according to the present invention, the oil-water mixture is discharged into the separation chamber at a point near the top of the chamber but spaced below the surface of the liquid in the chamber to provide a floatation space for oil collecting in droplets and floating to the top surface. The oil-water mixture flowing into the container must flow downwardly through the foam material, with the ground material providing an extremely large surface area for attracting any oil in the mixture. The oil is quickly attracted from the mixture, in the known manner, with the clarified water flowing downward to the opening of the discharge conduit adjacent the bottom surface of the container and outwardly to be discharged as clarified water. Continued use of the apparatus will result in the foam adjacent the top of the container becoming saturated first, with the saturation level progressively moving downward. However, as more oil enters the top, there is a tendency for droplets of oil to migrate, due to the difference in specific gravity, to the top of the container and the porous hydrophilic bag permits the droplets to pass therethrough so that a layer of oil is permitted to form in the top of the container. If desired, a second drain may be provided in the top of the container to draw-off the collected oils. For lighter weight oils, which separate easily, this may be more desirable than for heavier oils which have a lesser tendency to float to the top of the separation chamber.

BRIEF DESCRIPTION OF THE DRAWINGS

The foregoing and other objects and advantages of the invention will become more apparent from the detailed description contained hereinbelow, taken in conjunction with the drawings, in which.

DESCRIPTION OF THE PREFERRED EMBODIMENTS

Figure 1:
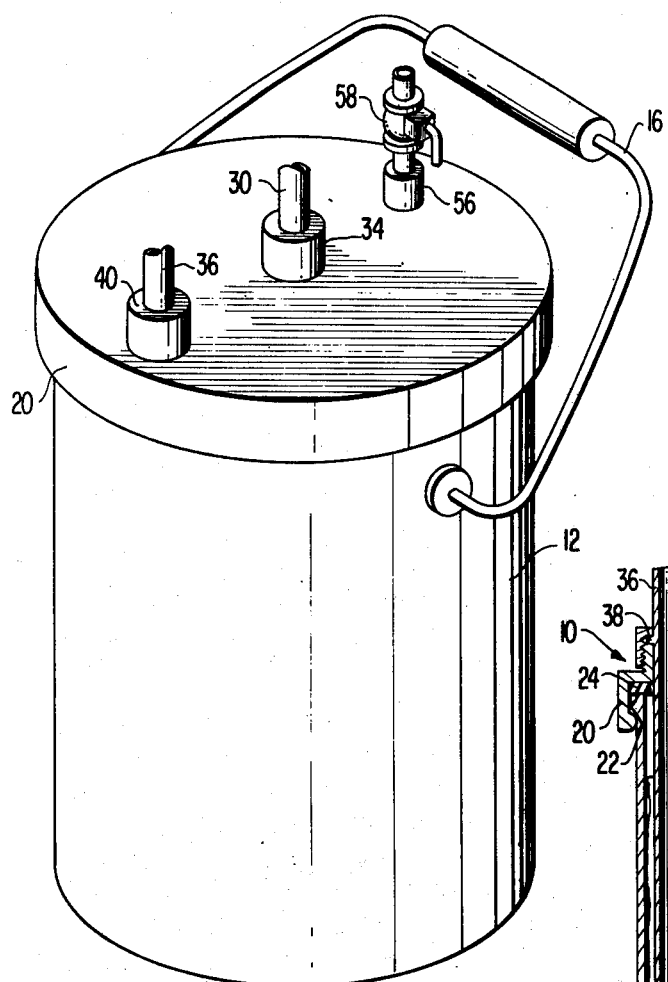
FIG. 1 is a perspective view of a separation apparatus according to the present invention.

Referring now to the drawings in detail, a water-oil separation apparatus according to the present invention is indicated generally in the drawings by the reference numeral 10 and comprises an open-toped container 12 having a removable closure 14 adapted to fit upon and sealingly close the open and thereof. In the drawings, the container is illustrated as comprising a molded thermoplastic bucket, or pail, including a suitable carrying bail 16. It is understood, however, that this exact construction of the container is not critical and other suitable container configurations such as the conventional 10, 25 or 55 gallon drums having a removable end closure panel may readily be employed, with the size of the container depending upon the ultimate use intended and the degree of portability desired. The illustrated embodiment is, however, especially well adopted for use in separating relatively small volumes of oil such as may be encountered in the bilges of relatively small boats.

Figure 2:
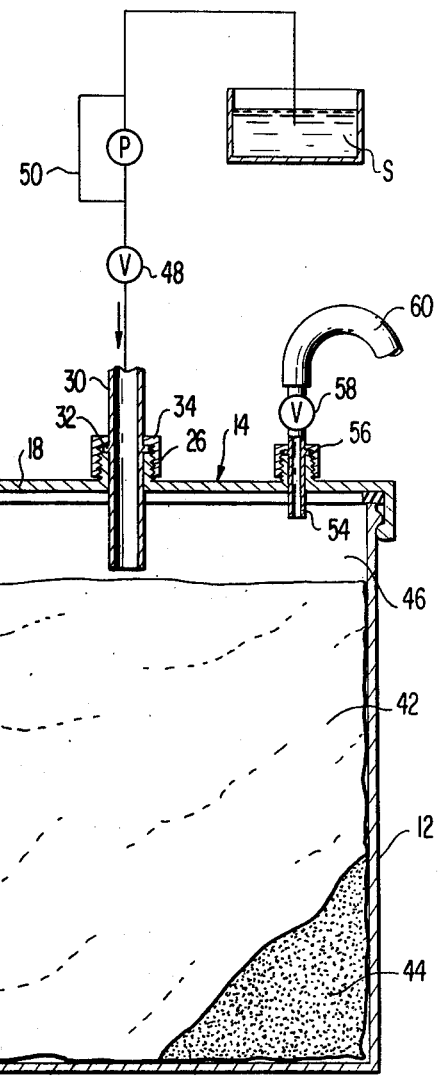
FIG. 2 is a sectional view, partially in schemmatic, of the apparatus shown in FIG. 1.
Figure 3:
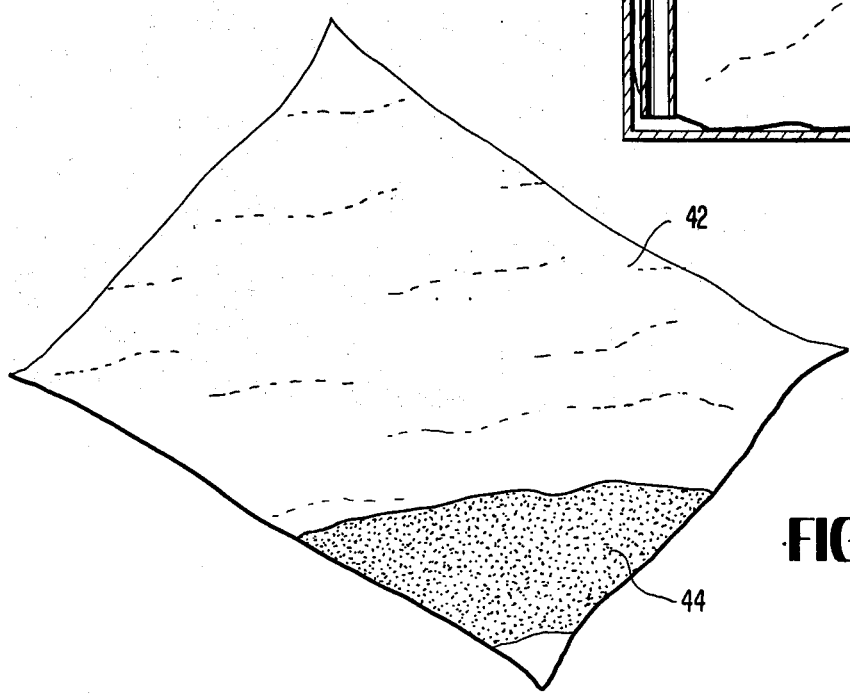
FIG. 3 is a perspective view of a bag of foam material employed in the apparatus.

Referring to FIG. 2, the closure 14 is illustrated as consisting of a substantially planar end panel 18 having a downwardly depending, annular skirt 20 adapted to snap over and be resiliently retained on the open top of the container 12 by an outwardly projecting annular bead 22 extending around the top of the container. A resilient gasket material 24 is carried on the inner surface of the end panel 18 in position to engage and form a fluid-tight seal with the top edge of the container 12.

Closure 14 is formed with a pair of outwardly directed short tubular nipples 26, 28 having male threads formed on their outer periphery. An inlet conduit 30 having an outwardly directed flange 32 formed on its outer surface is positioned within the tubular opening 26 with the flange 32 engaging the end thereof, and a threaded nut member 34 engaging threads on the nipple 26 to clamp the flange 32 and firmly mount the inlet tube 30 on the closure. The inlet tube 30 has an open discharge end which extends a short distance into the open top of the container 12 when the closure 14 is mounted thereon. Similarly, a discharge tube 36 having an outwardly extending flange 38 is mounted on the threaded nipple 28 by a nut member 40, with the discharge tube 36 extending into the container 12 with its open end positioned adjacent the bottom of the container when the closure 14 is mounted thereon. The nipple 28, and consequently the outlet conduit 36, is disposed adjacent the peripheral edge of the closure 14 so that the end of conduit 36 which projects into the container 12 extends closely adjacent the side wall thereof for reasons pointed out more clearly hereinbelow.

Positioned within the container 12 is a closed bag 42 formed from a porous, hydrophilic material such as a loosely woven cotton fabric which is filled with particles of a foamed oleophilic, polymeric material 44. The foam material 44 is preferably urethane foam having a density within the range of about 1.7 to about 2.3 pounds per cubic foot and preferably about 2 pounds per cubic foot. The foam is ground into relatively small particles with at least a major portion of the particles falling within the size range of about one-fourth to one-half inches. The dimension of the bag 42 is such that, when loosely filled with the ground foam material 44, the bag can be manually packed into the container 12, so as to substantially fill the container from the bottom to a position spaced slightly below the open top of the container.

If desired, a plurality of bags 42, loosely filled with the ground foam 44, may be employed, particularly in larger containers. It is important that the oleophilic foam 44 not be effected dimensionally by the oil attracted thereto. One type of foam material found to be particularly effective is a urethane foam manufactured by The Upjohn Company and sold under the designation KODE 25, which type of foam includes a number of closed cell foams commonly used as roof insulation materials. This type of foam material is capable, depending upon the density, of absorbing oil in amounts twenty to thirty times the basic weight of the foam. Thus, a cubic foot of the material having a density of about 2 pounds per cubic foot is capable of absorbing oil in an amount up to about sixty pounds.

In use of the oil-water separator according to the present invention, the bag 42 filled with foam 44 is packed into the bottom of the container 12 so as to fill the container to a position spaced just slightly below the open end of the container. The container is then filled to the top with clean water, and the closure 14 is mounted on the container, taking care to pass the discharge conduit 36, which is located adjacent the side of the closure for this purpose, down the side of the container between the container wall and the bag 42. When the closure 14 is mounted on the container, the bottom end of the inlet conduit 30 extends below the water level in the container, to terminate at a position substantially adjacent the top of the bag of foam. Preferably, the space 46 between the foam 44 and the closure 14 constitutes about 10% and not more than about 15% of the total volume of the container.

A mixture of water and oil is then flowed through the container from a supply such as the bilge of a boat, which supply is designated generally by the letter S in FIG. 2. The oil-water mixture is forced by pump P through a flow restricter indicated generally by the valve 48 through the inlet conduit 30 and discharged below the surface of the water in the area 46 between the closure 14 and the bag 42 so as to avoid excessive turbulence. The flow restricter valve 48 is adjusted to limit the rate of flow through the apparatus and a suitable bypass 50 is provided for the pump P. By restricting the rate of flow through the container, excessive turbulence is avoided and the oil-water mixture is permitted to disperse radially over the container and be forced downwardly through the foam 44 where the oil is attacted by the oleophilic foam particles whereby only clarified water reaches the bottom of the container to be discharged under pressure through the outlet conduit 36.

By maintaining a low rate of flow through the apparatus, oil will be first attracted by the particles of foam at the top portion of the bag, with the oil extending into the lower portions of the container only as the foam in the upper portion becomes saturated. However, as droplets of oil are attracted to the foam in the upper regions of the container, the oil droplets will tend to migrate toward the top of the water in the container due to their lower specific gravity. Thus, by providing the space 46 between the top of the container and the foam material, liquid oil may be collected, by floatation, in the top of the apparatus apart from the foam, per se, thereby extending the life of the foam. Further, when desired, the liquid oil collected in the top of the apparatus may be removed by providing a suitable drain as shown in FIG. 2. This drain may consist of a third outwardly extending tubular nipple 52 having a bleed tube 54 mounted therein by a suitable clamp nut 56. The bleed tube 54 extends into the container only a short distance below the under surface of the closure 14 and a substantial distance above the bottom of inlet tube 30. A valve 58 in bleed tube 54 enables the bleed to be selectively opened or closed to permit the flow of oil from the top of the container. If desired, a flexible drain tube 60 may be provided on the end of bleed tube 54 for the smaller units, whereas a more rigid plumbing may be desired for larger units.

Preferably, the ratio of the diameter to the height of the container 12 is within the range of from about 1/2 to about 1/1. In this ratio, and for conventional container designs ranging from about 5 gallons to about 55 gallons, a flow rate of from 0.1 to 0.5 cubic feet per minute through the apparatus can be clarified sufficiently for the water effluent to meet all requirements of the U.S. Coast Guard for discharge into navigable water. Larger units, and larger diameter units may obviously accommodate greater flows rates, and the quantity and nature of oil in the mixture will also affect the acceptable flow rate. When the effluent starts to show signs of oil, the apparatus may be recharged simply by opening the container and replacing the bag 42 of foam material 44 and disposing of the used bag.

Various modifications of the structure may readily be apparent to one skilled in the art without departing from the invention. Thus, while I have disclosed and described a preferred embodiment of my invention, I wish it understood that I do not intend to be restricted solely thereto, but rather that I intend to include all embodiments thereof which would be apparent to one skilled in the art and which come within the spirit and scope of my invention.

Other materials that have been successfully tested in the above apparatus are Upjohn UTHANE 200, ISONATE CRP 421, CPR 485 and CPR 425.

I claim:

1. A portable, rechargeable oil-water separation apparatus comprising a separation chamber defined by a generally cylindrical container having a closed bottom end and an open top end, a removable closure member adapted to fit on and sealingly close said open end, an inlet and an outlet formed in said removable closure and communicating with said chamber, said inlet including conduit having an open end positioned in the top portion of said chamber and spaced below said closure, said outlet including a discharge conduit having its open end positioned within said chamber adjacent said closed bottom end, means supplying an oil-water mixture under pressure to said chamber through said inlet conduit, flow restricting means in said inlet conduit for restricting the rate of flow of said oil-water mixture into said chamber, a supply of oleophilic, hydrophobic ground foamed polymeric material in said chamber between said open ends of said inlet and said discharge conduits, said foamed polymeric material being a closed cell urethane foam having a density within the range of 1.7 to 2.3 pounds per cubic foot and being ground so that at least a major portion of the ground particles are of a size within the range of one-fourth to one-half inch, said foamed material being contained within at least one closed bag formed from a porous hydrophilic material with said bag and said foamed material contained therein being packed into and substantially filling said chamber between said open ends of said inlet and discharge conduits with a portion of said chamber between said closure and said open end of said inlet conduit being substantially free of said foam material whereby, when said chamber is filled with water and an oil-water mixture is circulated therethrough from said inlet to said outlet conduits, the oil-water mixture is discharged into said chamber below the surface of the liquid therein and must flow downwardly through said bag of ground foamed plastic material and oil attracted by said foam material is permitted to float to said portion of said container which is substantially free of said foam material.

2. The apparatus as defined in claim 1 further comprising a drain opening communicating with said chamber adjacent said open top end of said container, and valve means for selectively opening and closing said drain.

3. The apparatus as defined in claim 1 wherein said portion of said chamber substantially free of said foamed material constitutes no more than about 10% of the total volume of said chamber.

4. The apparatus as defined in claim 3 wherein said bag is formed from a loosely woven cotton fabric material.

5. The apparatus as defined in claim 1 wherein the density of said foamed polymeric material is about 2 pounds per cubic foot.

* * * * *